June 22, 1926.

T. O. GAALAAS 1,589,685

HOE PLOW FOR POTATO PLANTING

Filed May 2, 1925

INVENTOR:

TORGER O. GAALAAS by Ellis S. Middleton
Atty.

Patented June 22, 1926.

1,589,685

UNITED STATES PATENT OFFICE.

TORGER O. GAALAAS, OF NES, HEDMARK, NORWAY.

HOE PLOW FOR POTATO PLANTING.

Application filed May 2, 1925, Serial No. 27,579, and in Germany February 20, 1925.

The present invention refers to an arrangement of plows, especially hoe-plows. For potato-planting up to this date one plow was usually employed for cutting the furrow, in which to plant the potatoes. For the covering of this furrow another plow was used, so that two men and two horses were required. Furthermore the covering plow could only be worked in one direction, and must be taken back to its starting-point again after the covering of each row of planted potatoes.

It is the aim of the present invention to remove these inconveniences and the invention is essentially characterized in that the two plows above mentioned have been combined into one implement, which at the same time cuts the furrow and covers the potatoes planted in the preceding furrow, the plow being arranged in such a way, that this work can be performed in both directions.

Figure 1:
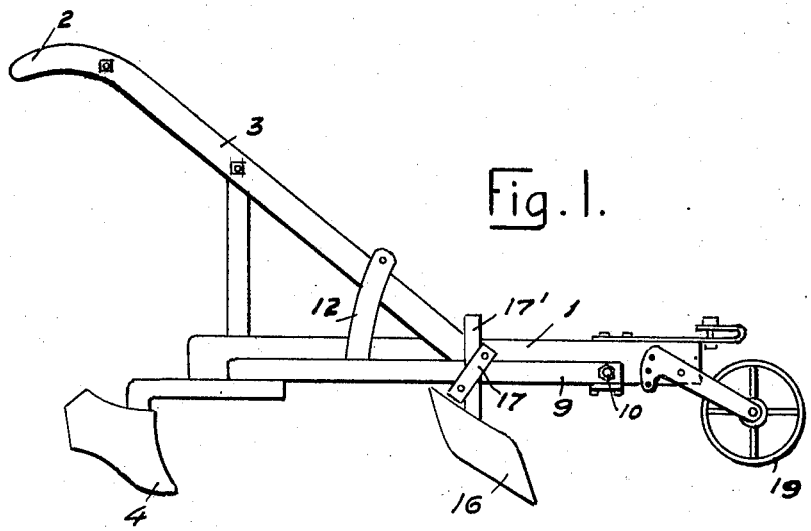

The appended drawing illustrates one way of carrying out the present invention,

Fig. 1 being a side elevation of the plow and

Figure 2:
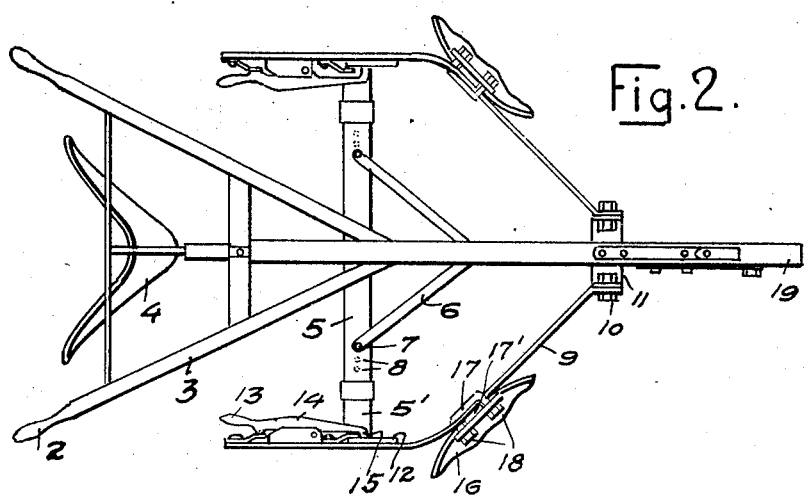

Fig. 2 a plan view.

The plow consists of the usual plow beam 1, to which the arms 3 with the handles 2 have been fastened. To the rear end of the plow-beam 1 is fastened the plow-share 4, which is shaped in the known way. To the plow-beam is fastened a cross-beam 5 kept in position by means of rods 6. The length of the cross-beam 5 can be varied as the ends 5' of the same are fastened by means of bolts 7, which also fasten the rods 6. The ends 5' are provided with several holes 8 or eventually with an elongated slot, so that the ends 5' can be displaced inward or outward.

On both sides of the plow the oblique bars 9 are mounted, the front ends of which are pivoted on bolts 10 in the cross-piece 11, which is fastened to the plowrod 1. The rear parts of these bars run parallel to the plow-beam and can be swung upwards along the guides 12 fastened to the adjustable ends 5' of the crossbeam 5.

The bars 9 can be fastened in different angles by means of a lever 14 provided with the handle 13 in one end and the catch 15 in the other end, which catch 15 can be brought in or out of contact with the grooves on the inside of the guide 12. To each of the bars 9 are fastened covering-plowshares 16, placed on the oblique parts of said bars by means of U-bolts 17, the ends of which embrace the plowshares and are fastened by means of the nuts 18. By loosening the said nuts, the plowshares can be moved along the oblique parts of the bars 9 and be fastened to the latter in the position wanted, whereby the distance between the plowbeam and these covering plowshares may be varied. The short cross-piece 11 is provided with devices, not shown on the drawing, for varying its length.

At the front end of the plow-beam the running wheel 19, the position of which can be adjusted vertically, is fastened in the known way.

When the plow is moved in one direction, the plowshare 4 will cut the furrow, in which the potatoes are to be planted. At the same time the plowshare 16 on the side of the plow turned against the field already plowed will cover the potatoes planted in the preceding furrow, the said plowshare 16 on the other side of the plow has been put out of work by being raised to its upmost position, where it is fastened by means of the catch 15 on the lever 14. When the plow is moved in the opposite direction the first mentioned plowshare 16 is raised and thereby put out of work, while the latter plowshare 16 is lowered down in its working position. Besides saving one plowing team this arrangement of two covering plowshares 16 also provides the advantage, that the work can be performed in both directions.

The distance wanted between the plowbeam or the cutting plowshare 4 and the covering plowshare 16 can be obtained by adjusting the length of the cross-beam 5, the position of the parts 5' being adjusted. At the same time the length of the short cross-piece 11 must be correspondingly adjusted in order to prevent bending of the bar 9.

The distance of the covering plowshare 16 from the center-line of the plow can, however, also be regulated by moving these shares along the bars 9, whereby the shares may also be adjusted vertically. By properly adjusting the shares 16 the plow according to the present invention can also be used as an ordinary covering plow.

This plow may also be used as a horse-hoe. In such a case further shares may be provided in front of the two shares 16 mentioned.

While one form of the present invention has now been described and shown in the drawing, the execution may, naturally, be varied without departing from the spirit and scope of the invention.

What I claim is:

A plow comprising a plow rod, pivoted side bars on each side thereof, each side bar carrying a plow share, means to fix each side bar against pivotal movement comprising a vertical guide rigidly secured to the plow rod having grooves on the inner side thereof, each side bar being provided with a lever, one end of which carries a hook engageable with the grooves on the vertical guide.

In testimony whereof I affix my signature.

TORGER O. GAALAAS.